(12) United States Patent
Hamada

(10) Patent No.: US 12,403,701 B2
(45) Date of Patent: Sep. 2, 2025

(54) LIQUID DISCHARGE APPARATUS, LIQUID DISCHARGE METHOD, AND STORAGE MEDIUM

(71) Applicant: Kyohei Hamada, Kanagawa (JP)

(72) Inventor: Kyohei Hamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 173 days.

(21) Appl. No.: 18/297,273

(22) Filed: Apr. 7, 2023

(65) Prior Publication Data
US 2023/0331001 A1 Oct. 19, 2023

(30) Foreign Application Priority Data

Apr. 18, 2022 (JP) ................................ 2022-068211

(51) Int. Cl.
*B41J 2/21* (2006.01)
*B41J 2/045* (2006.01)
(Continued)

(52) U.S. Cl.
CPC ......... *B41J 2/2132* (2013.01); *B41J 2/04505* (2013.01); *B41J 25/001* (2013.01); *G06K 15/107* (2013.01); *B41J 2/04581* (2013.01)

(58) Field of Classification Search
CPC .... B41J 2/2132; B41J 2/04505; B41J 25/001; B41J 2/04581; B41J 2/2054; B41J 2/07;
(Continued)

(56) References Cited

U.S. PATENT DOCUMENTS

| 6,932,454 B2 * | 8/2005 | Suzuki | H04N 1/00063 |
| | | | 347/41 |
| 2009/0219318 A1 * | 9/2009 | Maehira | G06K 15/107 |
| | | | 347/12 |

(Continued)

FOREIGN PATENT DOCUMENTS

| CN | 103660562 A | 3/2014 |
| CN | 106427215 A | 2/2017 |

(Continued)

OTHER PUBLICATIONS

Extended European Search Report dated Aug. 18, 2023 issued in corresponding European Patent Application No. 23168185.9.

(Continued)

*Primary Examiner* — Thinh H Nguyen
(74) *Attorney, Agent, or Firm* — Harness, Dickey & Pierce, P.L.C.

(57) ABSTRACT

A liquid discharge apparatus includes a recording head and circuitry including a selective-discharge mask having two or more bits. The circuitry moves the recording head relative to a recording medium while causing the recording head to discharge a liquid onto the recording medium, moves the recording head and the recording medium relative to each other while causing the recording head not to discharge the liquid, alternately repeats a main scanning movement operation and a sub-scanning movement operation, converts input data to dot data including two or more types of dots, changes the selective-discharge mask in accordance with the types of the dots, converts the dot data to scan data for each of the main scanning movement operation using the dot data and the selective-discharge mask, and transfers the scan data to the recording head to cause the recording head to discharge the liquid according to the scan data.

11 Claims, 13 Drawing Sheets

(51) Int. Cl.
*B41J 25/00* (2006.01)
*G06K 15/10* (2006.01)

(58) Field of Classification Search
CPC . B41J 2/21; B41J 3/543; B41J 29/393; G06K 15/107
See application file for complete search history.

(56) References Cited

U.S. PATENT DOCUMENTS

| | | |
|---|---|---|
| 2012/0194595 A1 | 8/2012 | Kawafuji et al. |
| 2014/0063107 A1 | 3/2014 | Fujita et al. |
| 2017/0036465 A1 | 2/2017 | Suzuki et al. |
| 2017/0120642 A1 | 5/2017 | Yamagata et al. |
| 2020/0290343 A1 | 9/2020 | Abe |
| 2021/0178755 A1 | 6/2021 | Abe |
| 2021/0291569 A1 | 9/2021 | Hada |
| 2022/0111659 A1 | 4/2022 | Abe et al. |

FOREIGN PATENT DOCUMENTS

| | | |
|---|---|---|
| CN | 109272471 A | 1/2019 |
| EP | 3147121 A1 | 3/2017 |
| JP | H06-238916 A | 8/1994 |
| JP | 2002-167106 | 6/2002 |
| JP | 2004-209943 | 7/2004 |
| JP | 2010-168218 | 8/2010 |
| JP | 2011-201207 | 10/2011 |
| JP | 2012-153118 A | 8/2012 |
| JP | 2021-094704 | 6/2021 |
| JP | 2021-146598 | 9/2021 |
| JP | 2023-006738 | 1/2023 |

OTHER PUBLICATIONS

Chinese Office Action dated May 28, 2025 issued in corresponding Chinese Patent Appln. No. 202310346681.6.

* cited by examiner

FIG. 10

SELECTIVE-DISCHARGE MASK / RIP DATA

| MASK | | | | | | | |
|---|---|---|---|---|---|---|---|
| 000 | 00 | 01 | 10 | 11 | 11 | 10 | 01 | 00 |
| 001 | 00 | 01 | 10 | 11 | 11 | 10 | 01 | 00 |
| 010 | 00 | 01 | 10 | 11 | 11 | 10 | 01 | 00 |
| 011 | 00 | 01 | 10 | 11 | 11 | 10 | 01 | 00 |
| 100 | 00 | 01 | 10 | 11 | 11 | 10 | 01 | 00 |
| 101 | 00 | 01 | 10 | 11 | 11 | 10 | 01 | 00 |
| 110 | 00 | 01 | 10 | 11 | 11 | 10 | 01 | 00 |
| 111 | 00 | 01 | 10 | 11 | 11 | 10 | 01 | 00 |

00: BLANK, 01: SMALL DROPLET,
10: MEDIUM DROPLET, 11: LARGE DROPLET

CALCULATION TABLE

| | | RIP DATA | | | |
|---|---|---|---|---|---|
| | | 00 | 01 | 10 | 11 |
| SELECTIVE-DISCHARGE MASK | 000 | 0 | 0 | 0 | 0 |
| | 001 | 0 | 1 | 0 | 0 |
| | 010 | 0 | 0 | 1 | 0 |
| | 011 | 0 | 0 | 0 | 1 |
| | 100 | 0 | 1 | 1 | 0 |
| | 101 | 0 | 1 | 0 | 1 |
| | 110 | 0 | 0 | 1 | 1 |
| | 111 | 0 | 1 | 1 | 1 |

FIG. 11

| NOZZLE No | SCAN DATA | | | | | | | |
|---|---|---|---|---|---|---|---|---|
| 1 | 0 | 0 | 0 | 0 | 0 | 0 | 0 | 0 |
| 2 | 0 | 1 | 0 | 0 | 0 | 0 | 1 | 0 |
| 3 | 0 | 0 | 1 | 0 | 0 | 1 | 0 | 0 |
| 4 | 0 | 0 | 0 | 1 | 1 | 0 | 0 | 0 |
| 5 | 0 | 1 | 1 | 0 | 0 | 1 | 1 | 0 |
| 6 | 0 | 1 | 0 | 1 | 1 | 0 | 1 | 0 |
| 7 | 0 | 0 | 1 | 1 | 1 | 1 | 0 | 0 |
| 8 | 0 | 1 | 1 | 1 | 1 | 1 | 1 | 0 |

FIG. 12

| SELECTIVE-DISCHARGE MASK | RIP DATA | | | | | | | |
|---|---|---|---|---|---|---|---|---|
| 000 | 00 | 01 | 10 | 11 | 11 | 10 | 01 | 00 |
| 001 | 00 | 01 | 10 | 11 | 11 | 10 | 01 | 00 |
| 010 | 00 | 01 | 10 | 11 | 11 | 10 | 01 | 00 |
| 011 | 00 | 01 | 10 | 11 | 11 | 10 | 01 | 00 |
| 100 | 00 | 01 | 10 | 11 | 11 | 10 | 01 | 00 |
| 101 | 00 | 01 | 10 | 11 | 11 | 10 | 01 | 00 |
| 110 | 00 | 01 | 10 | 11 | 11 | 10 | 01 | 00 |
| 111 | 00 | 01 | 10 | 11 | 11 | 10 | 01 | 00 |

FIG. 13

| | RIP DATA | | |
|---|---|---|---|
| | 11 | 10 | 01 |
| | FOURS PLACE | TWOS PLACE | ONES PLACE |
| SELECTIVE-DISCHARGE MASK | 0 | 0 | 0 |
| | 0 | 0 | 1 |
| | 0 | 1 | 0 |
| | 0 | 1 | 1 |
| | 1 | 0 | 0 |
| | 1 | 0 | 1 |
| | 1 | 1 | 0 |
| | 1 | 1 | 1 |

FIG. 14

| NOZZLE No | SCAN DATA | | | | | | | |
|---|---|---|---|---|---|---|---|---|
| 1 | 0 | 0 | 0 | 0 | 0 | 0 | 0 | 0 |
| 2 | 0 | 1 | 0 | 0 | 0 | 0 | 1 | 0 |
| 3 | 0 | 0 | 1 | 0 | 0 | 1 | 0 | 0 |
| 4 | 0 | 1 | 1 | 0 | 0 | 1 | 1 | 0 |
| 5 | 0 | 0 | 0 | 1 | 1 | 0 | 0 | 0 |
| 6 | 0 | 1 | 0 | 1 | 1 | 0 | 1 | 0 |
| 7 | 0 | 0 | 1 | 1 | 1 | 1 | 0 | 0 |
| 8 | 0 | 1 | 1 | 1 | 1 | 1 | 1 | 0 |

FIG. 15

| SELECTIVE-DISCHARGE MASK | RIP DATA | | | | | | | |
|---|---|---|---|---|---|---|---|---|
| 00 | 00 | 01 | 10 | 11 | 11 | 10 | 01 | 00 |
| 01 | 00 | 01 | 10 | 11 | 11 | 10 | 01 | 00 |
| 10 | 00 | 01 | 10 | 11 | 11 | 10 | 01 | 00 |
| 11 | 00 | 01 | 10 | 11 | 11 | 10 | 01 | 00 |
| 00 | 00 | 01 | 10 | 11 | 11 | 10 | 01 | 00 |
| 01 | 00 | 01 | 10 | 11 | 11 | 10 | 01 | 00 |
| 10 | 00 | 01 | 10 | 11 | 11 | 10 | 01 | 00 |
| 11 | 00 | 01 | 10 | 11 | 11 | 10 | 01 | 00 |

CALCULATION TABLE

| | | RIP DATA | | | |
|---|---|---|---|---|---|
| | | 00 | 01 | 10 | 11 |
| SELECTIVE-DISCHARGE MASK | 00 | 0 | 0 | 0 | 0 |
| | 01 | 0 | 1 | 1 | 0 |
| | 10 | 0 | 0 | 0 | 1 |
| | 11 | 0 | 1 | 1 | 1 |

00: BLANK, 01: SMALL DROPLET, 10: MEDIUM DROPLET, 11: LARGE DROPLET

| NOZZLE No | | SCAN DATA | | | | | | | |
|---|---|---|---|---|---|---|---|---|---|
| 1 | | 0 | 0 | 0 | 0 | 0 | 0 | 0 | 0 |
| 2 | | 0 | 1 | 1 | 0 | 0 | 1 | 1 | 0 |
| 3 | | 0 | 0 | 0 | 1 | 1 | 0 | 0 | 0 |
| 4 | | 0 | 1 | 1 | 1 | 1 | 1 | 1 | 0 |
| 5 | | 0 | 0 | 0 | 0 | 0 | 0 | 0 | 0 |
| 6 | | 0 | 1 | 1 | 0 | 0 | 1 | 1 | 0 |
| 7 | | 0 | 0 | 0 | 1 | 1 | 0 | 0 | 0 |
| 8 | | 0 | 1 | 1 | 1 | 1 | 1 | 1 | 0 |

LIQUID DISCHARGE APPARATUS, LIQUID DISCHARGE METHOD, AND STORAGE MEDIUM

CROSS-REFERENCE TO RELATED APPLICATION

This patent application is based on and claims priority pursuant to 35 U.S.C. § 119(a) to Japanese Patent Application No. 2022-068211, filed on Apr. 18, 2022, in the Japan Patent Office, the entire disclosure of which is hereby incorporated by reference herein.

BACKGROUND

Technical Field

Embodiments of the present disclosure relate to a liquid discharge apparatus, a liquid discharge method, and a storage medium storing a plurality of instructions.

Related Art

In the related art, a serial inkjet printer performs mask processing in which dot data after halftone processing is scanned with a mask pattern to print an image.

SUMMARY

Embodiments of the present disclosure describe an improved liquid discharge apparatus that includes a recording head and circuitry comprising a selective-discharge mask having two or more bits. The circuitry moves the recording head relative to a recording medium in a main scanning direction while causing the recording head to discharge a liquid onto the recording medium to perform a main scanning movement operation, moves one of the recording head and the recording medium relative to another of the recording head and the recording medium in a sub-scanning direction orthogonal to the main scanning direction while causing the recording head not to discharge the liquid to perform a sub-scanning movement operation, alternately repeats the main scanning movement operation and the sub-scanning movement operation to perform a multi-pass printing process, converts input data to dot data including two or more types of dots, changes the selective-discharge mask in accordance with types of the two types of dots, converts the dot data to scan data for each of the main scanning movement operation of the multi-pass printing process using the dot data and the selective-discharge mask, and transfers the scan data to the recording head to cause the recording head to discharge the liquid according to the scan data.

According to other embodiments of the present disclosure, there are provided a liquid discharge method and a non-transitory storage medium storing a plurality of instructions which, when executed by one or more processors, causes the processors to perform the liquid discharge method. The method includes moving a recording head relative to a recording medium in a main scanning direction while causing the recording head to discharge a liquid onto the recording medium to perform a main scanning movement operation, moving one of the recording head and the recording medium relative to another of the recording head and the recording medium in a sub-scanning direction orthogonal to the main scanning direction while causing the recording head not to discharge the liquid to perform a sub-scanning movement operation, alternately repeating the main scanning movement operation and the sub-scanning movement operation to perform a multi-pass printing process, converting input data to dot data including two or more types of dots, changing the selective-discharge mask in accordance with types of the two or more types of dots, converting the dot data to scan data for each of the main scanning movement operation of the multi-pass printing process using the dot data and the selective-discharge mask, and transferring the scan data to the recording head to cause the recording head to discharge the liquid according to the scan data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 10 is a chart illustrating processing of changing the selective-discharge method by the inkjet recording apparatus according to the first embodiment;

FIG. 11 is a chart illustrating the processing of changing the selective-discharge method by the inkjet recording apparatus according to the first embodiment;

FIG. 12 is a chart illustrating processing of changing the selective-discharge method by the inkjet recording apparatus according to a second embodiment;

FIG. 13 is a chart illustrating the processing of changing the selective-discharge method by the inkjet recording apparatus according to the second embodiment;

FIG. 14 is a chart illustrating the processing of changing the selective-discharge method by the inkjet recording apparatus according to the second embodiment;

FIG. 15 is a chart illustrating processing of changing the selective-discharge method by the inkjet recording apparatus according to a third embodiment;

Figure 1:
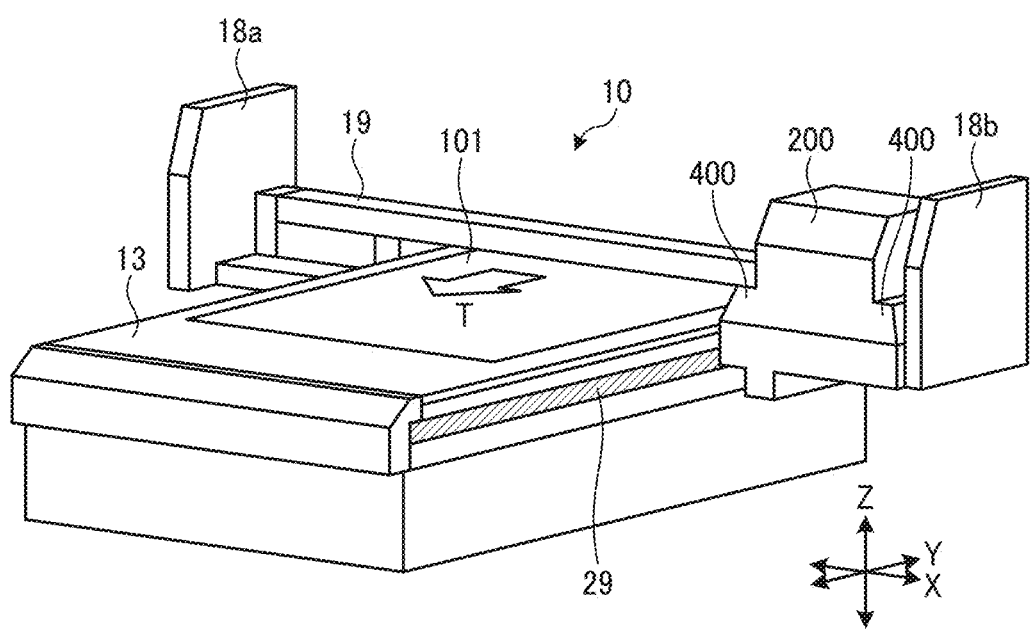
FIG. 1 is a perspective view of an inkjet recording apparatus as an image forming apparatus (liquid discharge apparatus) according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of a liquid discharge apparatus, a liquid discharge method, and a storage medium is described in detail below with reference to the accompanying drawings. A description is given of embodiments of the present disclosure. FIG. 1 is a perspective view of an inkjet recording apparatus 10 as an image forming apparatus (liquid discharge apparatus) according to embodiments of the present disclosure.

The inkjet recording apparatus 10 includes a carriage 200 and a stage 13 on which a recording medium 101 is placed. The carriage 200 is provided with a head device 350 (see FIG. 5) which is an inkjet image forming unit including multiple recording heads (liquid discharge heads) having multiple nozzles. The inkjet recording apparatus 10 discharges a liquid from the nozzles of the recording head (liquid discharge head) to forms an image. Nozzles of the recording head faces the stage 13. In the present embodiment, the liquid is, for example, ultraviolet (UV) curable ink.

An irradiation device 400, which is a light source for emitting UV rays, is mounted on a side face of the carriage 200 so as to face the stage 13. The irradiation device 400 emits light (e.g., UV rays) having a specific wavelength to cure the ink (liquid) discharged from the nozzles of the recording head.

A guide rod 19 is bridged between left and right side plates 18a and 18b. The guide rod 19 movably holds the carriage 200 in the X direction (main scanning direction). The carriage 200, the guide rod 19, and the side plates 18a and 18b are combined as a single body and movable together in the Y direction (sub-scanning direction) along a guide rail 29 disposed below the stage 13. Further, the guide rod 19 movably holds the carriage 200 in the Z direction (vertical direction).

In the configuration illustrated in FIG. 1, the stage 13 on which the recording medium 101 is placed may be stationary or may be moved relative to the carriage 200 in the direction indicated by arrow T illustrated in FIG. 1, for example. The inkjet recording apparatus 10 illustrated in FIG. 1 discharges the ink (liquid) from the nozzles onto the recording medium 101 while moving the recording head in the main scanning direction as a main scanning operation, and moves the recording head in the sub-scanning direction as a sub-scanning operation. The inkjet recording apparatus 10 alternately repeats the main scanning operation and the sub-scanning operation to form an image. In other words, in the inkjet recording apparatus 10 according to the present embodiment, the carriage 200, the guide rod 19, and the guide rail 29 function as an example of a printing device that performs a multi-pass printing process in which the main scanning operation and the sub-scanning operation are alternately repeated.

The main scanning operation is an example of a main scanning movement operation in which the inkjet recording apparatus 10 moves the recording head relative to the recording medium 101 in the main scanning direction (X direction) orthogonal to the sub-scanning direction (Y direction) while causing the recording head to discharge the ink to the recording medium 101. The sub-scanning operation is an example of a sub-scanning movement operation in which the inkjet recording apparatus 10 moves one of the recording head and the recording medium 101 relative to another of the recording head and the recording medium 101 in the sub-scanning direction while causing the recording head not to discharge the ink.

Figure 2:
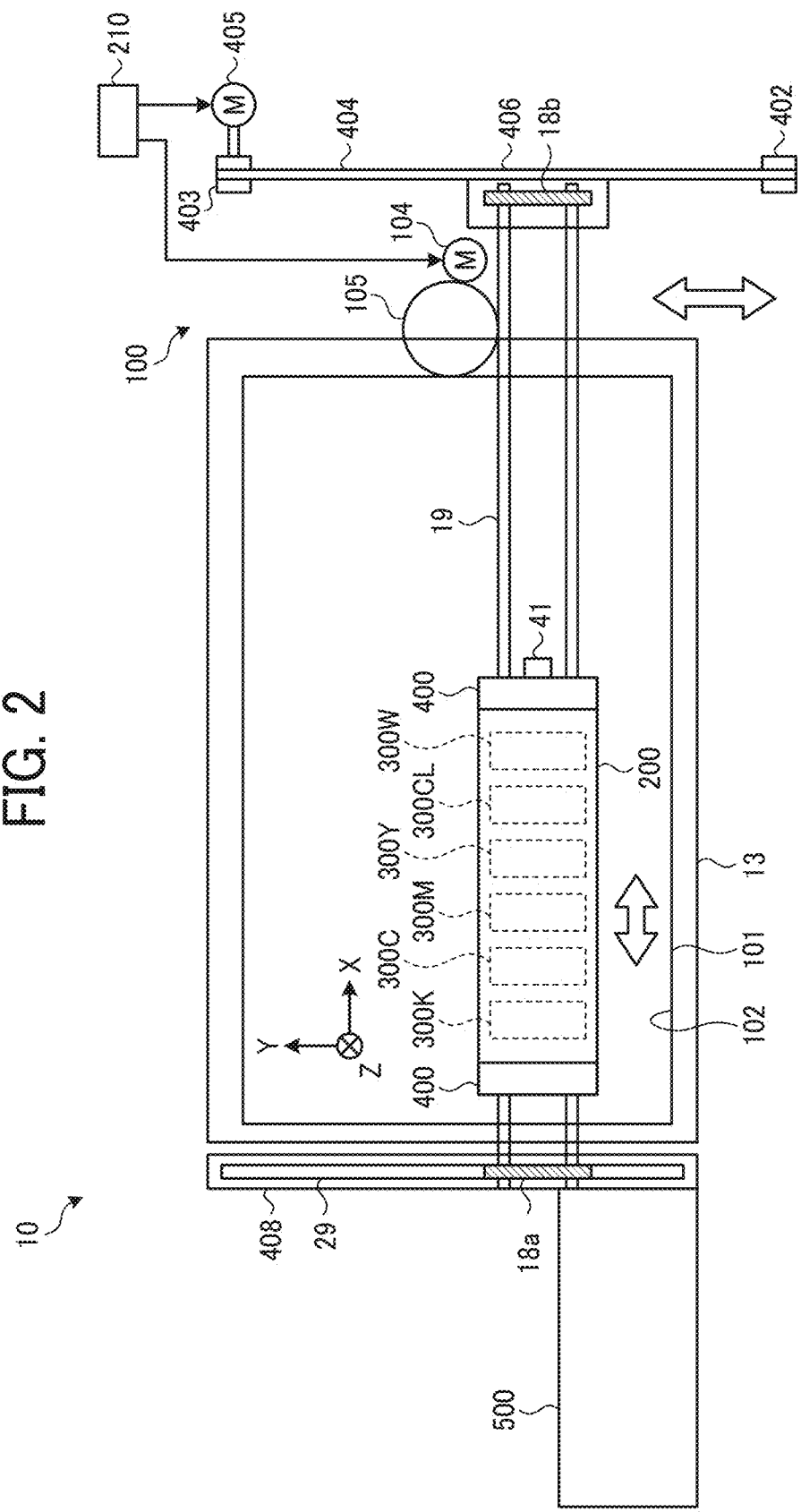
FIG. 2 is a schematic plan view of the inkjet recording apparatus according to embodiments of the present disclosure.
Figure 3:
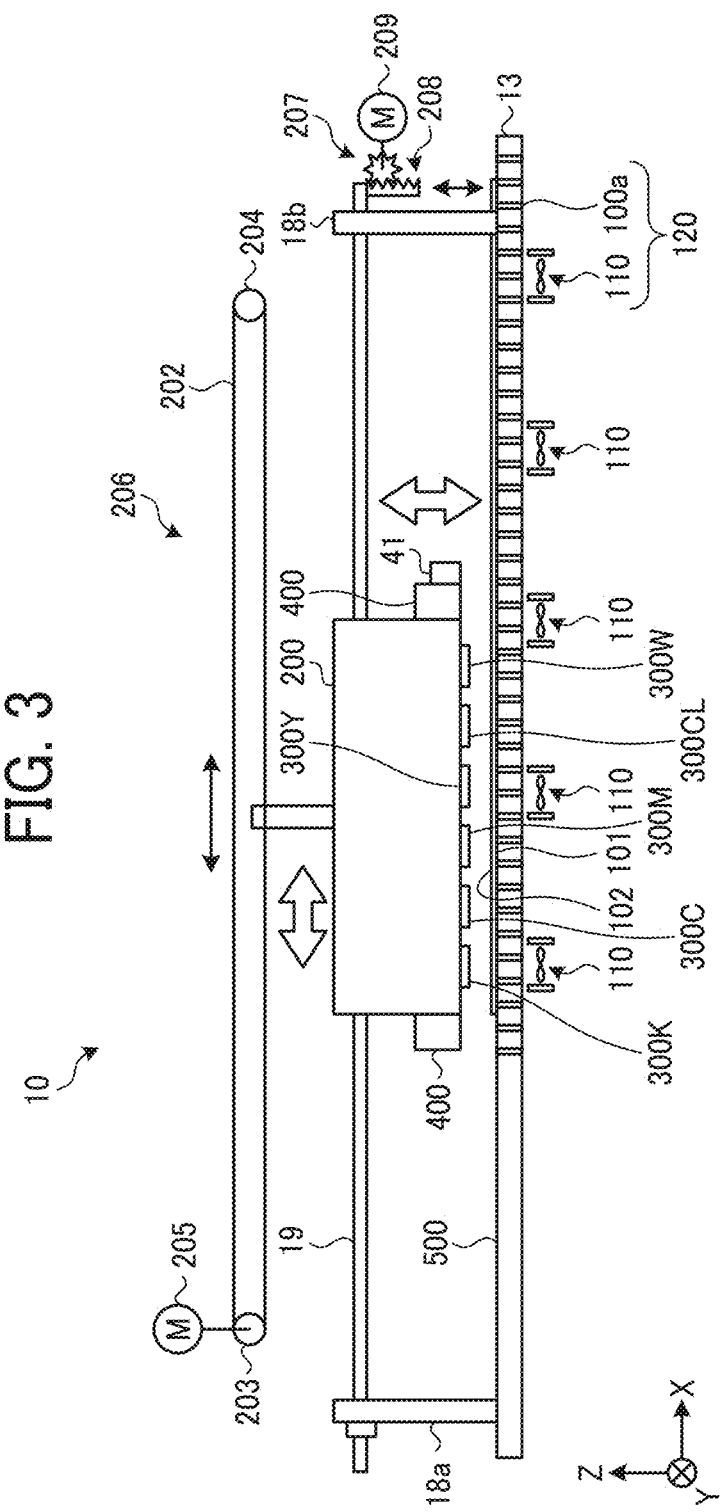
FIG. 3 is a schematic front view of the inkjet recording apparatus according to embodiments of the present disclosure.

FIG. 2 is a schematic plan view of the inkjet recording apparatus 10 as the image forming apparatus (liquid discharge apparatus) according to embodiments of the present disclosure. FIG. 3 is a schematic front view of the inkjet recording apparatus 10 according to embodiments of the present disclosure. In the inkjet recording apparatus 10 illustrated in FIGS. 2 and 3, an arrangement of some components is different from that in FIG. 1 for convenience of explanation, but these components have the same functions as in FIG. 1.

In FIGS. 1 to 3, the recording heads 300K, 300C, 300M, 300Y, 300CL, and 300W mounted on the carriage 200 are moved in the sub-scanning direction relative to the recording medium 101 in the sub-scanning operation. Hereinafter, the recording heads 300K, 300C, 300M, 300Y, 300CL, and 300W are also collectively referred to as "recording heads 300," and each of the recording heads 300K, 300C, 300M, 300Y, 300CL, and 300W is simply referred to as a "recording head 300" unless distinguished.

In addition, the stage 13 on which the recording medium 101 is placed can be moved relative to the carriage 200 in the sub-scanning direction. In this case, the stage 13 serves as a conveyance device in the sub-scanning direction, and moves (conveys) the recording medium 101 in the sub-scanning direction relative to the recording heads 300 in the sub-scanning operation.

In FIG. 2, the recording heads 300K, 300C, 300M, 300Y, 300CL, and 300W are arranged side by side in the main scanning direction in one row in a single head array on the carriage 200, but multiple recording heads 300K, 300C, 300M, 300Y, 300CL, and 300W may be arranged in multiple rows in the sub-scanning direction in the single head array.

Figure 4:
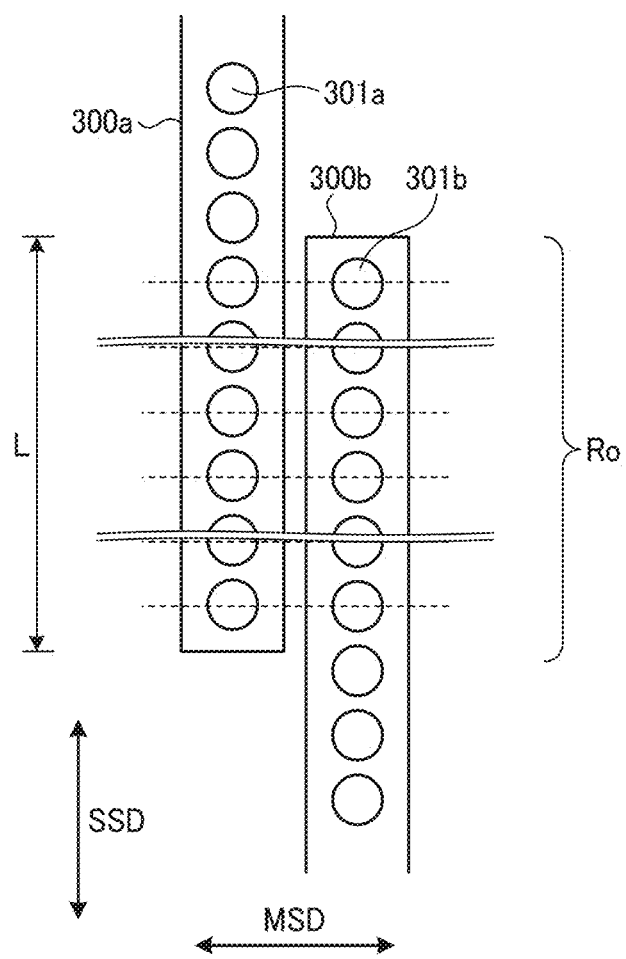
FIG. 4 is a plan view of an arrangement of nozzles in a recording head of the inkjet recording apparatus according to embodiments of the present disclosure.

FIG. 4 is a plan view of recording heads 300a and 300b illustrating an example of an arrangement of nozzles 301a and 301b in the inkjet recording apparatus 10 according to embodiments of the present disclosure.

The carriage 200 may include the recording head 300a for color ink, such as the recording heads 300K, 300C, 300M, and 300Y, and the recording head 300b for background ink, such as the recording heads 300CL and 300W, arranged as illustrated in FIG. 4. The recording head 300a for color and the recording head 300b for background ink have multiple nozzles 301a and 301b from which the ink is discharged, respectively. In each of the recording head 300a for color ink and the recording head 300b for background ink, the nozzles 301a and the nozzles 301b are arranged in the sub-scanning direction indicated by arrow SSD in FIG. 4.

The recording head 300a for color ink and the recording head 300b for background ink are arranged such that the positions of the nozzles 301a coincide with the positions of the nozzles 301b in the sub-scanning direction in an overlap region Ro having a length L. The recording head 300a for color ink and the recording head 300b for background ink overlap each other in the overlap region Ro. That is, the recording head 300a for color ink and the recording head 300b for background ink are arranged side by side in the main scanning direction indicated by arrow MSD, and the nozzles 301a of the recording head 300a for color ink and the nozzles 301b of the recording head 300b for background ink overlap each other in the overlapping region Ro in the sub scanning direction indicated by arrow SSD.

The recording head 300a for color ink and the recording head 300b for background ink includes driving elements corresponding to the nozzles 301a and 301b, respectively, and drive pulses are applied to the driving elements to control droplets of the ink discharged from the recording head 300a for color ink and the recording head 300b for background ink. For example, a piezoelectric element such as lead zirconate titanate (PZT) is used as the driving element. Hereinafter, each of the recording heads 300a and the recording head 300b is simply referred to as a "recording head 300." In addition, the nozzles 301a and the nozzles 301b are collectively referred to as "nozzles 301," and each of the nozzles 301a and the nozzles 301b is also simply referred to as a "nozzle 301" unless distinguished.

A description is given below of an example of a hardware configuration of an image forming system including the image forming apparatus (inkjet recording apparatus 10) with reference to FIGS. 1 to 3 and 5.

Figure 5:
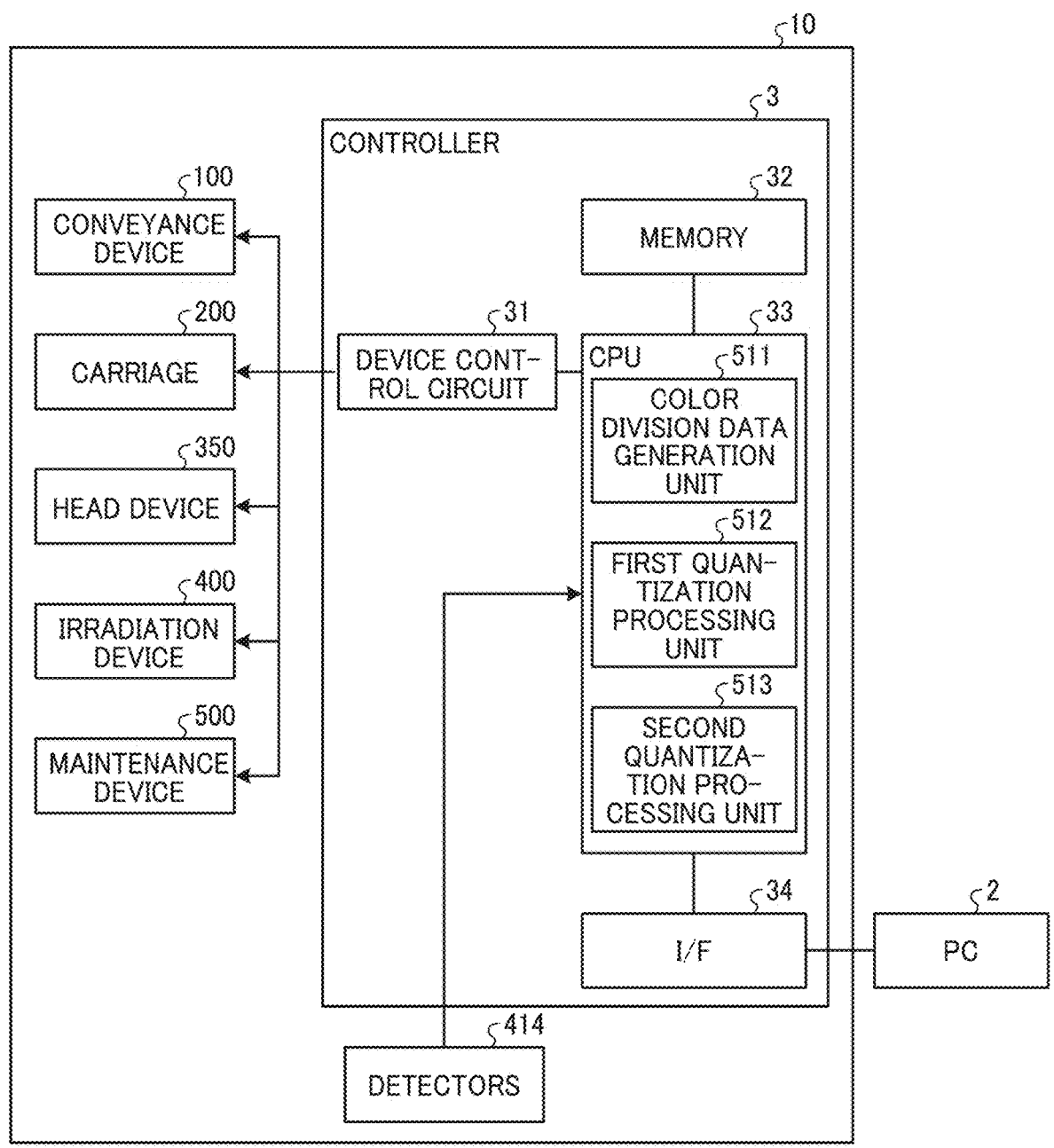
FIG. 5 is a block diagram of a hardware configuration of an image forming system including the inkjet recording apparatus according to embodiments of the present disclosure.

FIG. 5 is a block diagram of a hardware configuration of an image forming system according to embodiments of the present disclosure. In the image forming system illustrated in FIG. 5, a personal computer (PC) 2 as an external device is connected to the image forming apparatus (inkjet recording apparatus 10 illustrated in FIGS. 1 to 3) having a mechanical structure to form an image. The PC 2 performs image processing on the image to be formed. The image forming apparatus (inkjet recording apparatus 10) may have functions related to the image processing performed by the PC 2.

As illustrated in FIG. 5, the image forming apparatus (inkjet recording apparatus 10) according to the present embodiment includes a controller 3, detectors 414, a conveyance device 100, the carriage 200, the head device 350, the irradiation device 400, and a maintenance device 500. The controller 3 as circuitry includes a device control circuit 31, a memory 32, a central processing unit (CPU) 33, and an interface (I/F) 34.

The I/F 34 connects the image forming apparatus (inkjet recording apparatus 10) to the PC 2 as an external device. The image forming apparatus (inkjet recording apparatus 10) and the PC 2 can be connected in any form, for example, via a network or directly connected by a communication cable. Examples of the detectors 414 include various sensors in the inkjet recording apparatus 10.

The CPU 33 uses the memory 32 as a working area to control an operation of each device of the inkjet recording apparatus 10 via the device control circuit 31. Specifically, the CPU 33 controls the operation of each device such as the conveyance device 100, the carriage 200, the head device 350, the irradiation device 400, and the maintenance device 500 to form an image on the recording medium 101 based on recording data received from the PC 2 and data detected by the detectors 414. The image formed on the recording medium 101 is formed by the droplets of the ink (liquid) discharged from the head device 350. The droplets of the ink landed on the recording medium 101 form a liquid application surface 102 (i.e., the image) as illustrated in FIG. 3. The recording medium 101 is also referred to as a "substrate."

In the present embodiment, the CPU 33 includes a color division data generation unit 511, a first quantization processing unit 512, and a second quantization processing unit 513. The operations of the color division data generation unit 511, the first quantization processing unit 512, and the second quantization processing unit 513 are described later.

A printer driver is installed in the PC 2 to generate the recording data to be transmitted to the inkjet recording apparatus 10 from image data. The recording data includes command data to operate the conveyance device 100 and the like of the inkjet recording apparatus 10 and pixel data related to an image (liquid application surface 102) to be formed on the recording medium 101. The pixel data includes 2-bit data for each pixel, and is represented by 4 gradations, for example.

Components in the mechanical structure of the image forming apparatus (inkjet recording apparatus 10) are described with reference to FIGS. 2, 3, and 5. The conveyance device 100 includes the stage 13 and a suction mechanism 120 as illustrated in FIG. 3. The suction mechanism 120 includes fans 110 and a plurality of suction holes 100a formed in the stage 13. The suction mechanism 120 drives the fans 110 to suck the recording medium 101 through the plurality of suction holes 100a to temporarily secure the recording medium 101 on the stage 13 of the conveyance device 100. The suction mechanism 120 may attract the recording medium 101 onto the stage 130 using electrostatic attraction. The conveyance device 100 controls a relative movement between the carriage 200 and the recording medium 101 in the Y direction (sub-scanning direction) based on a drive signal from the CPU 33 via the device control circuit 31.

As illustrated in FIG. 2, the conveyance device 100 includes a conveyance controller 210, a roller 105, and a motor 104. The conveyance controller 210 drives the motor 104 to rotate the roller 105 to move the recording medium 101 on the stage 13 in the Y direction (sub-scanning direction).

The conveyance device 100 moves the carriage 200 in the Y direction (sub-scanning direction) in addition to the recording medium 101. That is, the conveyance device 100 moves one of the recording medium 101 and the carriage 200 relative to another of the recording medium 101 and the carriage 200 in the Y direction (sub-scanning direction).

As illustrated on the right side of FIG. 2, the conveyance device 100 includes the side plate 18b that supports the guide rod 19 to guide the carriage 200 in the X direction (main-scanning direction), a base 406 that supports the side plate 18b, a belt 404 coupled to the base 406, a drive pulley 403 and a driven pulley 402 around which the belt 404 is looped, a motor 405 that rotationally drives the drive pulley 403, and the conveyance controller 210.

As illustrated on the left side of FIG. 2, the conveyance device 100 further includes the side plate 18a that supports the guide rod 19 to guide the carriage 200 in the X direction (main-scanning direction), a base 408 that slidably supports the side plate 18a, and the guide rail 29 formed in the base 408 to guide the side plate 18a in the sub-scanning direction.

The conveyance device 100 controls the conveyance controller 210 to drive the motor 405 to rotate the drive pulley 403 and move the belt 404 in the Y direction (sub-scanning direction). The base 406 that supports the guide rod 19 holding the carriage 200 moves in the Y direction (sub-scanning direction) together with a movement of the belt 404. Accordingly, the carriage 200 moves in the Y direction (sub-scanning direction). The side plate 18a moves in the Y direction (sub-scanning direction) along the guide rail 29 in the base 408 as the base 406 moves in the Y direction (sub-scanning direction).

As illustrated in FIG. 2, the head device 350 includes the recording heads 300K, 300C, 300M, 300Y, 300CL, and 300W that discharge UV curable inks of black (K), cyan (C), magenta (M), yellow (Y), clear (CL), and white (W), respectively. The head device 350 is disposed on a lower face of the carriage 200.

The recording heads 300K, 300C, 300M, 300Y, 300CL, and 300W may be formed in the single head array, or each of the recording heads 300K, 300C, 300M, 300Y, 300CL, and 300W may be formed in the single head array. When the single head array includes the multiple recording heads 300, the multiple recording heads 300 may be arranged in a staggered manner or in one row.

The recording head 300 includes the piezoelectric element as the driving element. When the CPU 33 (the device control circuit 31) applies a drive signal to the piezoelectric element, the piezoelectric element contracts and expands to change a pressure of the ink (liquid) in the recording head 300, thereby discharge the UV curable ink onto the recording medium 101. Thus, the droplets of the ink discharged from the recording head 300 form the liquid application surface 102 on the recording medium 101.

The UV curable ink suitable in the present embodiment includes, for example, ink containing a methacrylate monomer. Methacrylate monomer has an advantage of relatively weak skin sensitization but has characteristics of large cure shrinkage as compared with a normal ink.

The irradiation device 400 is disposed on the side face (surface in the X direction) of the carriage 200. The irradiation device 400 irradiates the liquid application surface 102 on the recording medium 101 with UV rays based on a drive signal from the CPU 33 (device control circuit 31). The irradiation device 400 includes a UV irradiation lamp that emits UV rays.

The carriage 200 moves in the Z direction (height direction) and the X direction (main-scanning direction) based on a drive signal from the CPU 33 (device control circuit 31). The carriage 200 moves along the guide rod 19 in the main-scanning direction (X direction).

A scanning device 206 includes a drive pulley 203, a driven pulley 204, a drive belt 202, and a motor 205. The carriage 200 is secured to the drive belt 202 looped around the drive pulley 203 and the driven pulley 204. As the motor 205 rotates the drive pulley 203 to move the drive belt 202, the carriage 200 moves left and right in FIG. 3 in the main-scanning direction (X direction). The guide rod 19 is supported by the side plates 18a and 18b.

A height adjuster 207 includes a motor 209 and a slider 208. The height adjuster 207 drives the motor 209 to vertically move the slider 208, thereby moving the guide rod 19 upward and downward. As the guide rod 19 moves up and down, the carriage 200 moves up and down to adjust the height of the carriage 200 with respect to the recording medium 101.

A description is given below of an image forming operation of the inkjet recording apparatus 10 illustrated in FIGS. 1 to 3. The conveyance device 100 moves the recording medium 101 in the Y direction (sub-scanning direction) based on a drive signal from the CPU 33 (device control circuit 31) so that the recording medium 101 is positioned at an initial position to form an image (liquid application surface 102) on the recording medium 101.

Then, the carriage 200 moves to a height suitable for the head device 350 to discharge the UV curable ink (liquid) based on a drive signal from the CPU 33 (the device control circuit 31), for example, a height at which a gap between the lower surface of each recording head 300 of the head device 350 and the recording medium 101 is 1 mm. A height sensor 41 detects a height of the head device 350, and the CPU 33 acquires data of the height from the height sensor 41.

The carriage 200 reciprocally moves in the X direction (main-scanning direction) based on a drive signal from the CPU 33 (device control circuit 31). During a reciprocal movement of the carriage 200, the head device 350 discharges the UV curable ink (liquid) onto the recording medium 101 based on a drive signal from the CPU 33 (device control circuit 31). Thus, an image (liquid application surface 102) for one scan is formed on the recording medium 101.

When the image (liquid application surface 102) for one scan is formed on the recording medium 101, the conveyance device 100 moves the carriage 200 by a distance corresponding to the length of the image formed in the one scan in the Y direction (sub-scanning direction) based on a drive signal from the CPU 33 (device control circuit 31).

An operation of forming an image (liquid application surface 102) for one scan (i.e., the main scanning operation) and an operation of moving the carriage 200 in the Y direction (sub-scanning direction) by the distance for one scan (i.e., the sub-scanning operation) are alternately repeated to complete the entire image (liquid application surface 102) on the recording medium 101.

When the entire image (liquid application surface 102) on the recording medium 101 has been completed, the inkjet recording apparatus 10 waits for a predetermined time until the UV curable ink on the recording medium 101 is leveled (flattened). Above-described waiting time is also referred to as "leveling time." Then, the irradiation device 400 irradiates the liquid application surface 102 on the recording medium 101 with UV rays.

Figure 6:
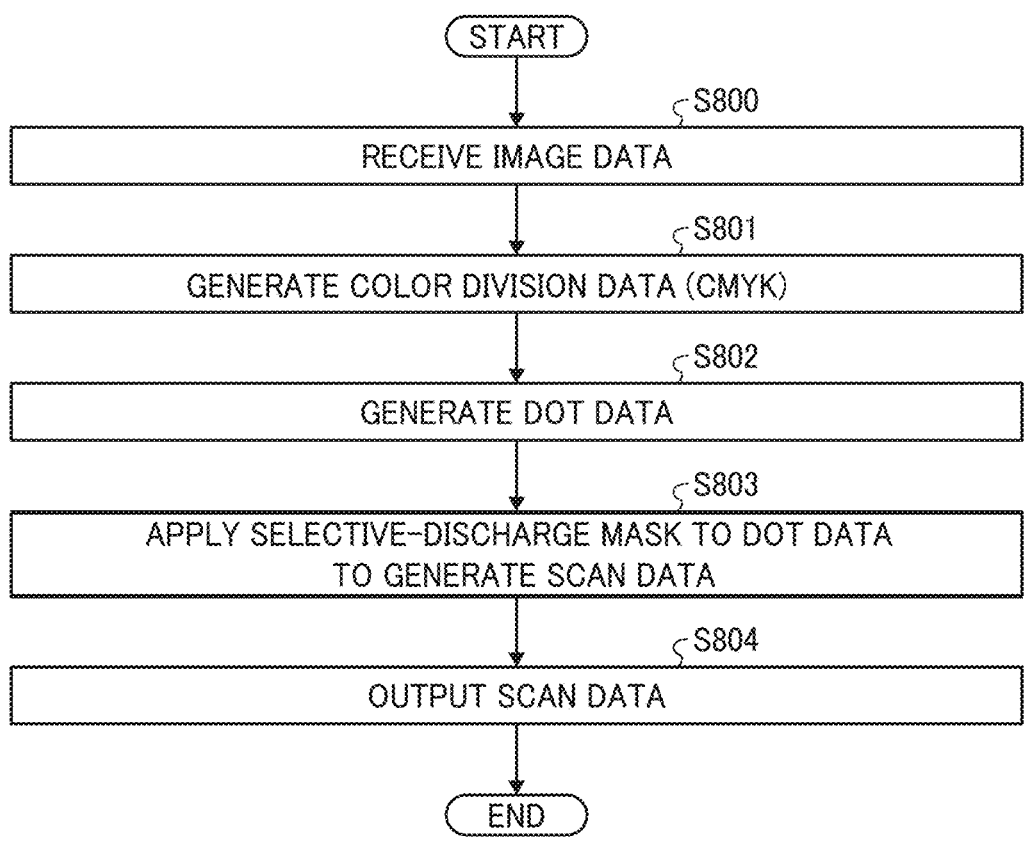
FIG. 6 is a flowchart illustrating a multi-pass printing process in the inkjet recording apparatus according to embodiments of the present disclosure.

FIG. 6 is a flowchart of the multi-pass printing process in the inkjet recording apparatus 10 according to embodiments of the present disclosure. A description is given below of the example of the multi-pass printing process in the inkjet recording apparatus 10 according to the present embodiment with reference to FIGS. 5 and 6.

When the controller 3 receives image data to be printed (step S800), the color division data generation unit 511 generates color division data for each color of ink used in the inkjet recording apparatus 10 from the received image data (an example of input data or an input image input to the controller 3) (step S801). For example, when the inkjet recording apparatus 10 uses inks of C, M, Y, and K, the color division data generation unit 511 generates color division data for each color of C, M, Y, and K from the received image data.

The first quantization processing unit 512 applies the dot-data generation mask to the color division data of each color generated by the color division data generation unit 511 to generate dot-data (step S802). The dot data generation mask is, for example, a dither mask having a threshold value used in halftone processing. That is, the first quantization processing unit 512 converts the image data into the dot data. At this time, the CPU 33 converts the image date into the dot date including at least two types of dots. The dot data includes, as at least two types of dots, a dot (i.e., a first dot) formed by a small droplet and a dot (i.e., a second dot) formed by a large droplet having a larger droplet volume than the dot of the small droplet. The dot data may include a dot of a medium droplet having a larger droplet volume than the dot of the small droplet and a smaller droplet volume than the dot of the large droplet.

The second quantization processing unit 513 applies a selective-discharge mask to the dot data generated by the first quantization processing unit 512 to generate scan data (step S803). That is, the second quantization processing unit 513 determines to use which of the nozzles 301a and 301b to form a dot of the image for each scan of the recording heads 300 in the main scanning direction. In the present embodiment, the selective-discharge mask is an example of a mask having two or more bits.

In the present embodiment, the second quantization processing unit 513 converts the dot data into the scan data for each scan (i.e., the main scanning movement operation) using the dot data and the selective-discharge mask by calculation. At this time, the second quantization processing unit 514 changes a selective-discharge method of dots (e.g., changes the selective-discharge mask) in accordance with the types of dots in the dot data. Thus, the selective-discharge method of the dots can be continuously changed without switching the selective-discharge method at a specific gradation. As a result, deterioration of image quality can be prevented, in particular, in an image with gradient.

Then, the device control circuit 31 outputs (transfers) the generated scan data to a drive circuit in the recording head 300 (step S804) to cause the recording head 300 to discharge the liquid according to the scan data, thereby printing an image on the recording medium 101 based on the scan data.

Figure 7:
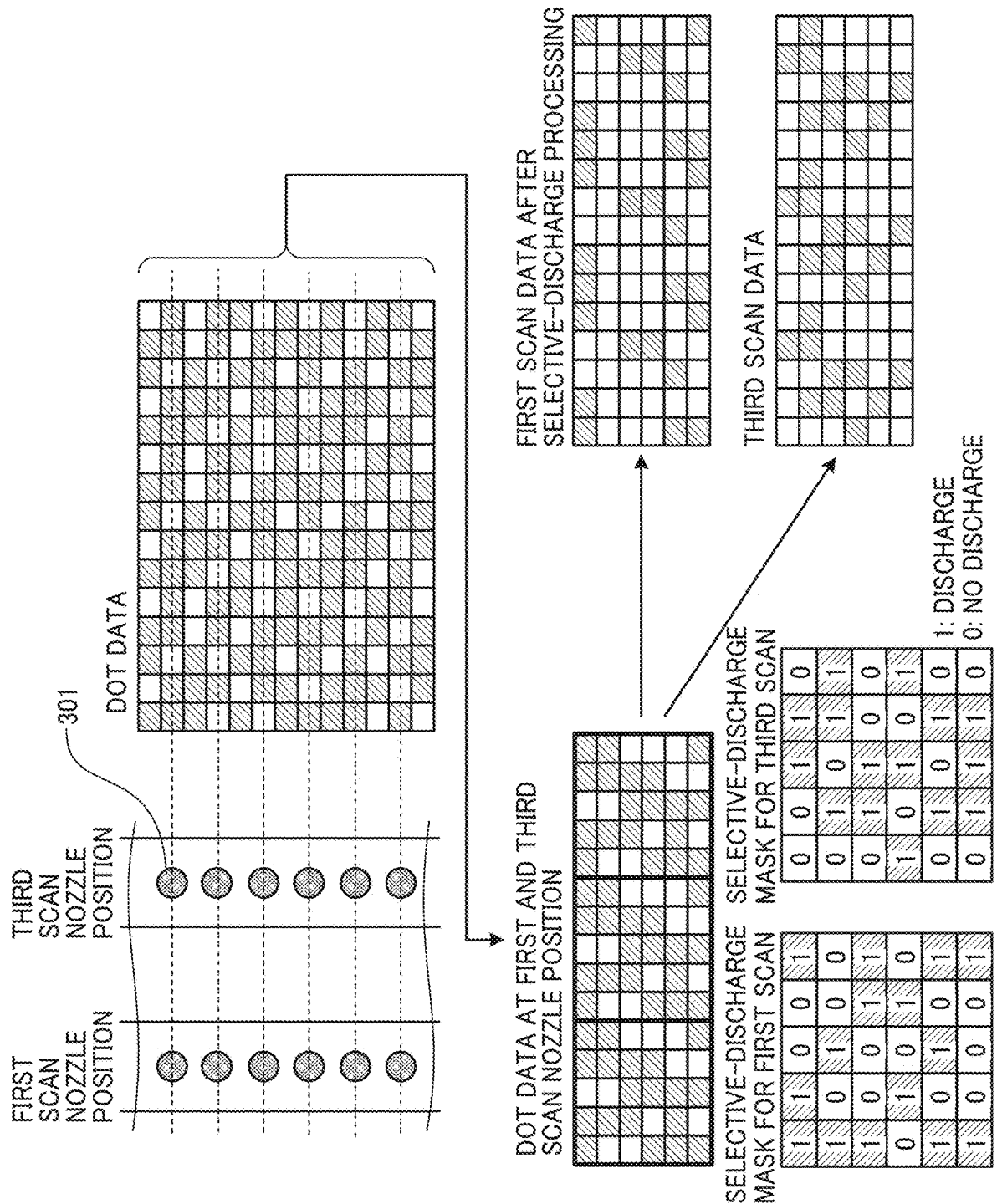
FIG. 7 is a diagram illustrating scan data generation processing executed by the inkjet recording apparatus according to a first embodiment of the present disclosure.

FIG. 7 is a diagram illustrating an example of scan data generation processing executed by the inkjet recording apparatus 10 according to a first embodiment of the present disclosure. A description is given below of the scan data generation processing executed by the inkjet recording apparatus 10 according to the present embodiment with reference to FIG. 7. The scan data generation processing for first and third scans of the recording head 300 in a multi-scanning with 2-pass ½-interlace is described below, and the scan data generation processing for second and fourth scans is executed in the same manner.

First, as illustrated in FIG. 7, the second quantization processing unit 513 extracts pixels (dot data at first and third scan nozzle positions) on scanning lines of the nozzles 301 in the first and third scans of the recording head 300. Specifically, the broken lines in FIG. 7 indicate the scanning lines along which the nozzles 301 are moved in the first and third scans, and the second quantization processing unit 513 extracts the pixels (the dot data at the first and third scan nozzle positions) on the scanning lines.

Then, the second quantization processing unit 513 generates scan data (first and third scan data) for each of the first scan and the third scan by performing mask processing on the extracted pixels using the selective-discharge mask (i.e., the selective-discharge mask for the first scan and the selective-discharge mask for the third scan). For example, as illustrated in FIG. 7, the second quantization processing unit 513 applies the selective-discharge mask for the first scan to the dot data for the first and third scans to generate scan data for the first scan, and applies the selective-discharge mask for the third scan to the dot data for the first and third scans to generate scan data for the third scan.

At this time, the second quantization processing unit 513 generates the scan data indicating that ink (liquid) is discharged to a pixel corresponding to a digit "1" of the selective-discharge mask illustrated in FIG. 7 and indicating that ink is not discharged to a pixel corresponding to a digit "0" of the selective-discharge mask illustrated in FIG. 7 among the pixels of the dot data. The selective-discharge mask is provided for each scan of the recording head 300 to indicate a dot arrangement position which is positions of the pixels to which ink is discharged from the nozzles 301 in the scan. For example, as illustrated in FIG. 7, the selective-discharge mask includes binary data indicating whether or not ink (liquid) is discharged from the nozzles 301 for each dot.

When the multi-scanning is performed with 2-pass ½-interlace, the selective-discharge masks (e.g., for the first scan and for the third scan) complement each other to generate the scan date in which the positions of the nozzles 301 in the sub-scanning direction overlap each other. For this reason, the second quantization processing unit 513 performs the mask processing on the dot data with multiple selective-discharge masks that complement each other to decompose the dot data into multiple sets of scan data corresponding to the number of scans of the recording head 300.

Figure 8:
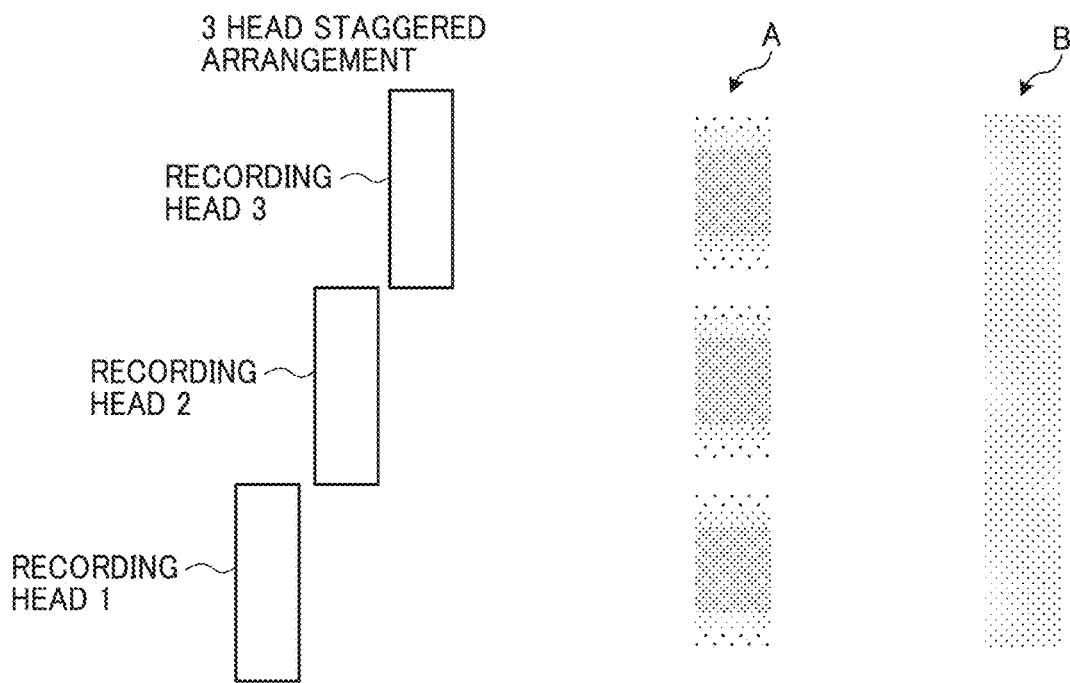
FIG. 8 is a diagram illustrating a selective-discharge method of dots for each gradation performed by the inkjet recording apparatus according to the first embodiment.

With reference to FIG. 8, a description is given below of the selective-discharge method of dots for each gradation by the inkjet recording apparatus 10 according to the present embodiment. FIG. 8 is a diagram illustrating the selective-discharge method of the dots for each gradation by the inkjet recording apparatus 10 according to the first embodiment. In FIG. 8, a light-colored region has a smaller discharge amount of ink than a dark-colored region. The discharge amount corresponds to the ratio of dots discharged on the recording medium 101 in each scan to the dots in the original dot data. First, the selective-discharge method suitable for each of a low gradation region and a high gradation region of the image is described.

In the low gradation region, image density unevenness is more likely to occur than in the high gradation region higher than the low gradation region. One of causes of the image density unevenness is that a dot diameter at an end of the recording head 300 (hereinafter, referred to as a head end region) is different from dot diameters at the other region. Accordingly, a mask A is desirable to reduce the discharge amount of ink to be discharged from the head end region of the recording head 300 to the recording medium 101.

On the other hand, in the high gradation region, the image density is saturated, and the image density unevenness is likely to be inconspicuous. However, as an adhesion amount of ink on the recording medium 101 increases, a surface state of the image (liquid application surface 102) is likely to be uneven, and a gloss unevenness becomes noticeable, in particular, when the UV ink is used. When the mask A having a sharp change in the discharge amount of ink, the surface state of the image changes in a region where the discharge amount changes, and thus the gloss unevenness may occur. Accordingly, a mask B having a small change in the discharge amount of ink is desirable in the high gradation region.

As described above, the optimum shape of the selective-discharge mask has a trade-off between the image quality in the high gradation region and the image quality in the low gradation region. Therefore, the second quantization processing unit 513 changes the selective-discharge method in accordance with the gradation, thereby enhancing the image quality.

Figure 9:
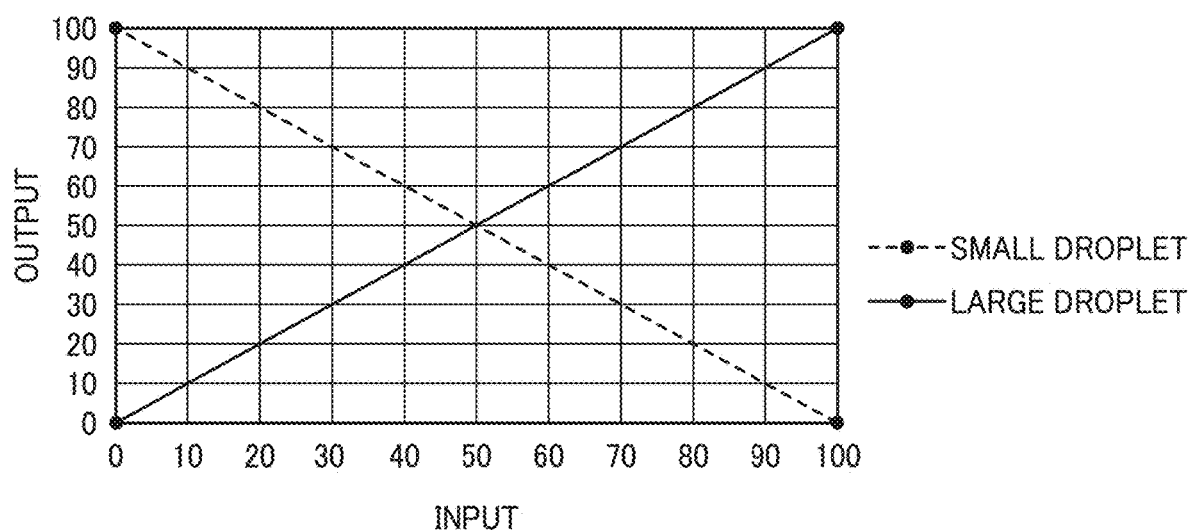
FIG. 9 is a graph illustrating an effect obtained by changing the selective-discharge method for each droplet type by the inkjet recording apparatus according to the first embodiment.

With reference to FIG. 9, a description is given below of an effect obtained by changing the selective-discharge method for each type of dot (hereinafter referred to as a droplet type) in the inkjet recording apparatus 10 according to the present embodiment. FIG. 9 is a graph illustrating the effect obtained by changing the selective-discharge method for each droplet type in the inkjet recording apparatus 10 according to the first embodiment. In FIG. 9, the horizontal axis represents an input (gradation of the input image, which is also referred to as an input gradation), and the vertical axis represents an output (the discharge amount of each droplet type).

In the present embodiment, the second quantization processing unit 513 changes the selective-discharge method (e.g., changes the selective-discharge mask) for each droplet type. Normally, the droplet types used for printing are controlled and replaced as illustrated in FIG. 9. For example, when the input gradation, which is the gradation of the input image, is 50%, the second quantization processing unit 513 converts the dot data including 50% of large droplets and 50% of small droplets into the scan data. As illustrated in FIG. 9, the first quantization processing unit 512 converts the input image into the dot data so as to increase the ratio of dots of the small droplet to all dots and decrease the ratio of dots of the large droplet to all dots in the low gradation region as compared with in the high gradation region. The second quantization processing unit 513 applies the mask A to the dots of the small droplet in the dot data to convert the dot data into the scan data. The discharge amount at the end of the recording head 300 is lower than that at the center of the recording head 300 in the mask A. The second quantization processing unit 513 applies the mask B to the dots of the large droplet in the dot data to convert the dot data into the scan data. A change rate in the discharge amount in the mask B is smaller than that in the mask A for the small droplet.

For example, when the second quantization processing unit 513 applies the mask B to the large droplet and applies the mask A to the small droplet illustrated in FIG. 9, the discharge amount by the mask B continuously increases with an increase in the input gradation. For example, when the input gradation is 50%, the second quantization processing unit 513 uses the mask A in 50% of the dot data and the mask B in the 50% of the dot data. As a result, the second quantization processing unit 513 changes the selective-discharge method (e.g., the selective-discharge mask) for each droplet type, and continuously changes the selective-discharge method in accordance with the image density. Accordingly, the deterioration of the image quality can be prevented, in particular, in an image with gradient.

FIG. 10 and FIG. 11 are charts illustrating processing of changing the selective-discharge method by the inkjet recording apparatus 10 according to the first embodiment. In the dot data, which is an example of raster image processor (RIP) data, illustrated in FIG. 10, digits "00" represents a blank, digits "01" represents the small droplet, digits "10" represents the medium droplet, and digits "11" represents the large droplet in the image.

In the present embodiment, the second quantization processing unit 513 converts the dot data into the scan data for each scan using the selective-discharge mask prepared in advance and a calculation table as a second quantization processing. The calculation table is a table in which the dot data is associated with the selective-discharge mask applied to the dot data. For example, the calculation table is stored in the memory 32 of the controller 3. The selective-discharge mask illustrated in FIG. 10 has three types of dots and three bits. The selective-discharge mask has 1 column horizontally, 8 rows vertically, and 3 bits, for example. The dot date (RIP data) has 8 columns horizontally, 8 rows vertically, and 2 bits, for example. As illustrated in FIG. 10, the second quantization processing unit 513 may perform the calculation between the selective-discharge mask and the dot data (RIP data) using the calculation table to generate the scan data (see FIG. 11).

As described above, the inkjet recording apparatus 10 according to the first embodiment continuously changes the selective-discharge method in accordance with the image density. In other words, the inkjet recording apparatus 10 does not switch the selective-discharge method stepwise at a specific gradation. As a result, the deterioration of the image quality can be prevented, in particular, in an image with gradient.

A second embodiment is described below. In the present embodiment, a place (i.e., the number of digit) of the bits of the selective-discharge mask with which the dot data is calculated is different depending on the type of dot in the dot data. Redundant descriptions of the same components as those described above in the first embodiment may be omitted below.

FIGS. 12 to 14 are charts illustrating processing of changing the selective-discharge method by the inkjet recording apparatus 10 according to the second embodiment. In the present embodiment, the second quantization processing unit 513 may change the place (the number of digit) of the bits of the selective-discharge mask to be calculated in accordance with the types of dot data (droplet type). In the present embodiment, the number of bits of the selective-discharge mask is equal to or greater than the number of types of dot data. In this case, the second quantization processing unit 513 may change the selective-discharge method for all droplet types of dots in the dot data.

For example, as illustrated in FIGS. 12 and 13, the second quantization processing unit 513 determines whether or not to discharge ink (i.e., 0: non-discharge or 1: discharge) by fours place (a third digit) of the bits for the large droplet, twos place (a second digit) of the bits for the medium droplet, and ones place (i.e., a first digit) for the small droplet. Thus, the second quantization processing unit 513 generates the scan data as illustrated in FIG. 14. As described above, the inkjet recording apparatus 10 according to the second embodiment achieves the same effects as those in the first embodiment.

A third embodiment is described below. In the present embodiment, the number of the bits of the selective-discharge mask is smaller than the number of types of dots in the dot data. Redundant descriptions of the same components as those described above in the first embodiment may be omitted below.

Figures 16, 17:
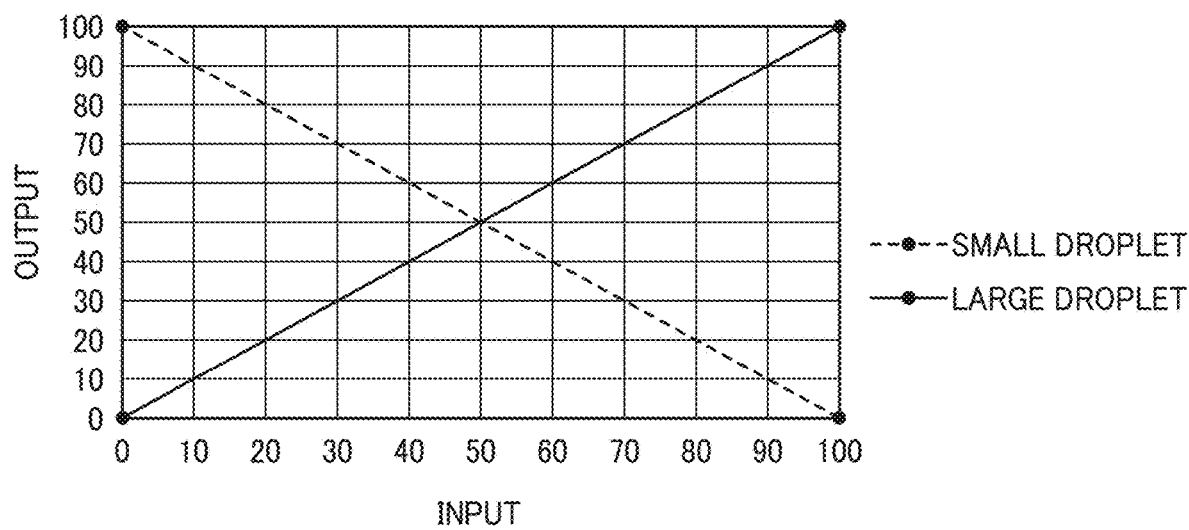
FIG. 16 is a chart illustrating the processing of changing the selective-discharge method by the inkjet recording apparatus according to the third embodiment.
FIG. 17 is a graph illustrating processing of changing the selective-discharge method by the inkjet recording apparatus according to a fourth embodiment.

FIG. 15 and FIG. 16 are charts illustrating processing of changing the selective-discharge method by the inkjet recording apparatus 10 according to the third embodiment.

In the present embodiment, the number of bits of the selective-discharge mask is smaller than the number of types of dots. For this reason, the number of droplet types for changing the selective-discharge method can be reduced, thereby increasing the processing speed of the conversion processing from the dot data to the scan data. As illustrated in FIG. 15, the second quantization processing unit 513 performs the calculation between the selective-discharge mask and the dot data (RIP data) using the calculation table. Thus, the second quantization processing unit 513 generates the scan data as illustrated in FIG. 16.

In the inkjet recording apparatus 10 according to the third embodiment, the number of droplet types for changing the selective-discharge method can be reduced, thereby increasing the processing speed of the conversion processing from the dot data to the scan data.

A fourth embodiment is described below. In the present embodiment, the selective-discharge mask causes the recording head 300 to reduce the discharge amount of ink at the end of the recording head 300 lower than that at the center of the recording head 300 for the dots in the low gradation region among the dots in the dot data, and causes the recording head 300 to reduce the change rate in the discharge amount of ink for the dots in the high gradation region among the dots in the dot data lower than that in the low gradation region. Redundant descriptions of the same components as those in the above-described embodiments may be omitted below.

Figure 18:
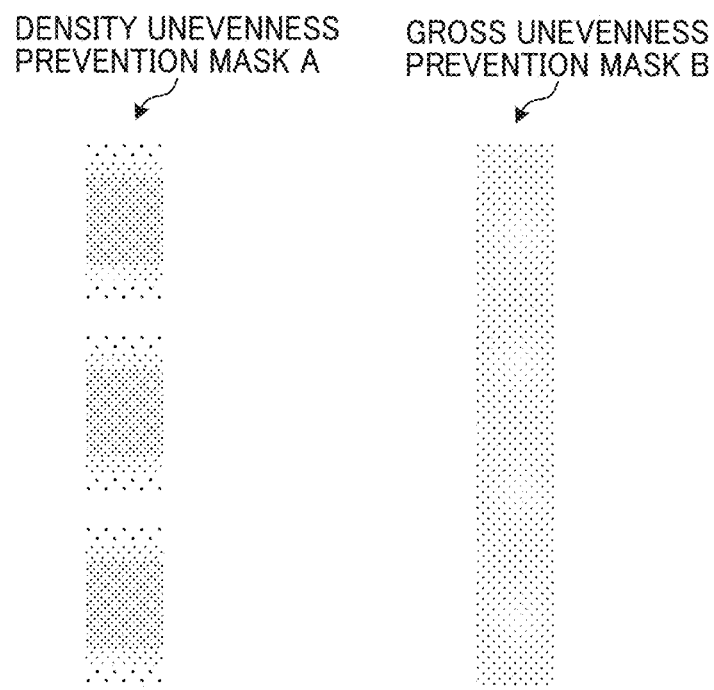
FIG. 18 is a diagram illustrating the processing of changing the selective-discharge method by the inkjet recording apparatus according to the fourth embodiment.

FIG. 17 and FIG. 18 are diagrams illustrating processing of changing the selective-discharge method by the inkjet recording apparatus 10 according to the fourth embodiment. In the present embodiment, the selective-discharge mask causes the recording head 300 to reduce the discharge amount of ink at the end of the recording head 300 lower than that at the center of the recording head 300 for the dots in the low gradation region among the dots in the dot data. In other words, the selective-discharge mask causes the recording head 300 to discharge the liquid for a first discharge amount at each of end portions of the recording head 300 and discharge the liquid for a second discharge amount larger than the first discharge amount at a center portion between the end portions of the recording head 300. Accordingly, in the low gradation region, the selective-discharge mask reduces the discharge amount of ink to be discharged from the head end region of the recording head 300, thereby preventing the image density unevenness.

In the present embodiment, the selective-discharge mask causes the recording head 300 to reduce the change rate in the discharge amount of ink for the dots in the high gradation region lower than that in the low gradation region among the dots in the dot data. In other words, the selective-discharge mask causes the recording head 300 to discharge the liquid with a first change rate between the first discharge amount and the second discharge amount for the two or more types of dots in the first gradation region and the selective-discharge mask causes the recording head 300 to discharge the liquid with a second change rate between the first discharge amount and the second discharge amount for the two or more types of dots in the second gradation region. The second change rate is smaller than the first change rate. Accordingly, in the high gradation region, the selective-discharge mask reduces the change rate in the discharge amount of ink, thereby preventing the gloss unevenness. For example, in the configuration of the droplet types illustrated in FIG. 17, the second quantization processing unit 513 uses a density unevenness prevention mask A for the small droplets and a gloss unevenness prevention mask B for the large droplets as illustrated in FIG. 18.

As described above, the inkjet recording apparatus 10 according to the fourth embodiment changes the selective-discharge method depending on the gradation so as to reduce the discharge amount at the end of the recording head 300 in the low gradation region to prevent the image density unevenness, and so as to reduce the sharp change in the discharge amount in the high gradation region to prevent the gloss unevenness.

Programs executed in the inkjet recording apparatus 10 according to the present embodiment is installed in the memory 32 such as a read only memory (ROM) in advance. Alternatively, the programs executed in the inkjet recording apparatus 10 according to the present embodiment may be stored, in an installable or executable file format, in a computer readable recording medium, such as a compact disc read only memory (CD-ROM), a flexible disk (FD), a compact disc recordable (CD-R), and a digital versatile disk (DVD).

Alternatively, the programs executed in the inkjet recording apparatus 10 according to the present embodiment may be stored in a computer connected to a network such as the Internet and downloaded via the network. Alternatively, the computer programs executed in the inkjet recording apparatus 10 according to the present embodiment may be supplied or distributed via a network such as the Internet.

The program executed by the inkjet recording apparatus 10 according to the present embodiment has a modular configuration including the above-described units (the color division data generation unit 511, the first quantization processing unit 512, and the second quantization processing unit 513). The CPU 33 (an example of a processor) serving as actual hardware reads the programs from the memory 32 such as the ROM and executes the programs so as to load these units on a main storage device to implement the color division data generation unit 511, the first quantization processing unit 512, and the second quantization processing unit 513 on the main storage device.

As described above, according to the present disclosure, the image quality can be enhanced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A liquid discharge apparatus comprising:
a recording head; and
circuitry comprising a selective-discharge mask having two or more bits,
wherein the circuitry is configured to
move the recording head relative to a recording medium in a main scanning direction while causing the recording head to discharge a liquid onto the recording medium to perform a main scanning movement operation;
move one of the recording head and the recording medium relative to another one of the recording head and the recording medium in a sub-scanning direction orthogonal to the main scanning direction while causing the recording head not to discharge the liquid to perform a sub-scanning movement operation;
alternately repeat the main scanning movement operation and the sub-scanning movement operation to perform a multi-pass printing process including a plurality of main scanning movement operations and a plurality of sub-scanning movement operations;
convert input data to dot data including two or more types of dots;
change the selective-discharge mask in accordance with types of the two or more types of dots;
convert the dot data to scan data for each of the plurality of main scanning movement operations of the multi-pass printing process using the dot data and the selective-discharge mask;
transfer the scan data to the recording head to cause the recording head to discharge the liquid according to the scan data to print an image; and
apply a first selective-discharge mask to the two or more types of dots in a first gradation region of the image to convert the dot data into the scan data, and
the first selective-discharge mask is configured to cause the recording head to
discharge the liquid as having a first discharge amount at each of end portions of the recording head, and
discharge the liquid as having a second discharge amount larger than the first discharge amount at a center portion of the recording head between the end portions of the recording head.

2. The liquid discharge apparatus according to claim 1, wherein the circuitry further comprises a calculation table in which the dot data is associated with the selective-discharge mask to be applied to the dot data, and
the circuitry is further configured to convert the dot data to the scan data using the calculation table.

3. The liquid discharge apparatus according to claim 2, wherein a number of the two or more bits of the selective-discharge mask is equal to or greater than a number of the two or more types of dots in the dot data, and
the circuitry is further configured to change the selective-discharge mask for each of the types of the two or more types of dots in the dot data.

4. The liquid discharge apparatus according to claim 2, wherein a number of the two or more bits of the selective-discharge mask is smaller than a number of the types of the two or more types of dots in the dot data.

5. The liquid discharge apparatus according to claim 2, wherein the two or more types of dots in the dot data includes
first dots formed by first droplets; and
second dots formed by second droplets having larger droplet volumes than the first droplets.

6. The liquid discharge apparatus according to claim 5, wherein the circuitry is further configured to apply a second selective-discharge mask to the second dots to convert the dot data to the scan data,
the first selective-discharge mask is configured to cause the recording head to discharge the liquid with a first change rate between the first discharge amount and the second discharge amount for the first dots, and
the second selective-discharge mask is configured to cause the recording head to discharge the liquid with a second change rate between the first discharge amount and the second discharge amount, the second change rate being smaller than the first change rate, for the second dots.

7. The liquid discharge apparatus according to claim 2, wherein the two or more types of dots in the dot data includes
first dots formed by first droplets; and
second dots formed by second droplets having larger droplet volumes than the first droplets, and
the circuitry is further configured to
increase a first ratio of the first dots to all dots of the two or more types of dots to be larger than a second ratio of the second dots to said all dots in the first gradation region, and
increase a third ratio of the second dots to said all dots to be larger than the first ratio in a second gradation region of the image that is higher than the first gradation region.

8. The liquid discharge apparatus according to claim 1, wherein the circuitry is further configured to change a number of a digit in the two or more bits of the selective-discharge mask used to convert the dot data to the scan data in accordance with the types of the two or more types of dots in the dot data.

9. The liquid discharge apparatus according to claim 1, wherein the circuitry is further configured to apply a second selective-discharge mask to the two or more types of dots in a second gradation region of the image that is higher than the first gradation region to convert the dot data to the scan data,
the first selective-discharge mask is configured to cause the recording head to discharge the liquid with a first change rate between the first discharge amount and the second discharge amount for the two or more types of dots in the first gradation region, and
the second selective-discharge mask is configured to cause the recording head to discharge the liquid with a second change rate between the first discharge amount and the second discharge amount, the second change rate being smaller than the first change rate, for the two or more types of dots in the second gradation region.

10. A liquid discharge method comprising:
moving a recording head relative to a recording medium in a main scanning direction while causing the recording head to discharge a liquid onto the recording medium to perform a main scanning movement operation;
moving one of the recording head and the recording medium relative to another one of the recording head and the recording medium in a sub-scanning direction orthogonal to the main scanning direction while causing the recording head not to discharge the liquid to perform a sub-scanning movement operation;

alternately repeating the main scanning movement operation and the sub-scanning movement operation to perform a multi-pass printing process including a plurality of main scanning movement operations and a plurality of sub-scanning movement operations;

converting input data to dot data including two or more types of dots;

changing a selective-discharge mask having two or more bits in accordance with types of the two or more types of dots;

converting the dot data to scan data for each of the plurality of main scanning movement operations of the multi-pass printing process using the dot data and the selective-discharge mask;

transferring the scan data to the recording head to cause the recording head to discharge the liquid according to the scan data to print an image; and applying a first selective-discharge mask to the two or more types of dots in a first gradation region of the image to convert the dot data into the scan data, and the first selective-discharge mask is configured to cause the recording head to
discharge the liquid as having a first discharge amount at each of end portions of the recording head, and
discharge the liquid as having a second discharge amount larger than the first discharge amount at a center portion of the recording head between the end portions of the recording head.

11. A non-transitory storage medium storing a plurality of instructions which, when executed by one or more processors, causes the one or more processors to perform a method, comprising:

moving a recording head relative to a recording medium in a main scanning direction while causing the recording head to discharge a liquid onto the recording medium to perform a main scanning movement operation;

moving one of the recording head and the recording medium relative to another one of the recording head and the recording medium in a sub-scanning direction orthogonal to the main scanning direction while causing the recording head not to discharge the liquid to perform a sub-scanning movement operation;

alternately repeating the main scanning movement operation and the sub-scanning movement operation to perform a multi-pass printing process including a plurality of main scanning movement operations and a plurality of sub-scanning movement operations;

converting input data to dot data including two or more types of dots;

changing a selective-discharge mask having two or more bits in accordance with types of the two or more types of dots;

converting the dot data to scan data for each of the plurality of main scanning movement operations of the multi-pass printing process using the dot data and the selective-discharge mask;

transferring the scan data to the recording head to cause the recording head to discharge the liquid according to the scan data to print an image; and applying a first selective-discharge mask to the two or more types of dots in a first gradation region of the image to convert the dot data into the scan data, and the first selective-discharge mask is configured to cause the recording head to
discharge the liquid as having a first discharge amount at each of end portions of the recording head and
discharge the liquid as having a second discharge amount larger than the first discharge amount at a center portion between the end portions of the recording head.

\* \* \* \* \*